(12) United States Patent  
Richman et al.

(10) Patent No.: US 11,350,138 B2  
(45) Date of Patent: May 31, 2022

(54) MANAGING A MULTI-VIEW EVENT COMPRISING SEVERAL STREAMS, STREAM BUFFERS, AND RENDERING ONTO A SINGLE CANVAS

(71) Applicant: Sony Corporation, Tokyo (JP)

(72) Inventors: Steven Richman, San Diego, CA (US); Tanmay Agnihotri, San Diego, CA (US); Graham Clift, Poway, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/879,696

(22) Filed: May 20, 2020

(65) Prior Publication Data

US 2021/0368215 A1    Nov. 25, 2021

(51) Int. Cl.
*H04N 21/218* (2011.01)
*H04N 21/845* (2011.01)
*H04N 21/2187* (2011.01)

(52) U.S. Cl.
CPC ... *H04N 21/21805* (2013.01); *H04N 21/2187* (2013.01); *H04N 21/8456* (2013.01)

(58) Field of Classification Search
CPC ......... H04N 21/21805; H04N 21/2187; H04N 21/8456
USPC ........................................................ 348/159
See application file for complete search history.

(56) References Cited

U.S. PATENT DOCUMENTS

| | | | | |
|---|---|---|---|---|
| 9,838,730 B1 * | 12/2017 | Matias | ............... | H04N 21/4302 |
| 9,838,731 B1 * | 12/2017 | Matias | ............... | H04N 21/4302 |
| 2003/0197785 A1 * | 10/2003 | White | ................ | H04N 21/4314 |
| | | | | 348/207.99 |
| 2005/0216951 A1 * | 9/2005 | MacInnis | ......... | H04N 21/44222 |
| | | | | 725/135 |
| 2007/0219984 A1 * | 9/2007 | Aravamudan | ...... | G06F 16/2462 |
| 2015/0340009 A1 * | 11/2015 | Loeffler | ................ | G06F 3/1446 |
| | | | | 345/1.3 |
| 2017/0134785 A1 * | 5/2017 | Bostick | .............. | H04N 21/6543 |
| 2018/0160166 A1 * | 6/2018 | Sprenger | ............ | H04N 21/4305 |
| 2018/0249167 A1 * | 8/2018 | Deshpande | ............ | H04N 19/46 |
| 2018/0255332 A1 * | 9/2018 | Heusser | ........... | H04N 21/21805 |
| 2019/0082232 A1 * | 3/2019 | Eilat | .................... | H04N 21/482 |
| 2019/0349676 A1 * | 11/2019 | Chen | ...................... | H04R 3/005 |
| 2019/0370926 A1 * | 12/2019 | Hagland | ................ | G06F 3/011 |

FOREIGN PATENT DOCUMENTS

GN    107211186 B    3/2020

OTHER PUBLICATIONS

Carney, Michael, "SkreensTV wants to turn your TV into a multi-screen content-streaming machine". PANDO, Nov. 13, 2014.

* cited by examiner

*Primary Examiner* — Loi H Tran (74) *Attorney, Agent, or Firm* — John L. Rogitz; John M. Rogitz (57) ABSTRACT

JavaScript in a Multiview template adjusts playout of two AV streams of the same event from two buffers such that the two streams are synchronized on a display. The playout from one buffer is adjusted based on an observed difference between actual playout times of frames from the respective buffers with the same timestamps.

12 Claims, 7 Drawing Sheets

MANAGING A MULTI-VIEW EVENT COMPRISING SEVERAL STREAMS, STREAM BUFFERS, AND RENDERING ONTO A SINGLE CANVAS

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (also referred to as "over the air" or "OTA") and related broadband delivered content and services (also referred to as "over the top" or "OTT"). ATSC 3.0 is designed to be flexible so that as technology evolves, advances can be readily incorporated without requiring a complete overhaul of any related technical standard.

Present principles are directed to such advances as divulged below. As recognized herein, ATSC 3.0 may be used to deliver Multiview video experience to end users.

SUMMARY

Present principles are directed to managing a multi-view event at end user receivers, which requires distribution signaling and video player logic that stitches the component videos together into a single live production video event, referred to herein in specific embodiments as a TV event. Video stream buffers play out simultaneously from the TV and are managed with the live broadcast playout systems coming from the event itself and through the broadcast control center. Individual buffers are created for each stream and each buffer is controlled during playback to be in synchronization with the other event streams. The streams may display the same live content but with various camera angles, mimicking what OB trucks do at stadiums when the cameras feed live switchers and then get interleaved into one production playout feed. As understood herein, in the case of Multiview at end user receivers timed coordination is necessary when a broadcaster is delivering multiple video and audio streams connected to a single live TV event to ensure each stream is played back with a single timing mechanism shared among a Multiview template's individual elements.

Accordingly, an assembly includes at least one receiver device with at least one display, at least one broadcast signal receiver, and at least one processor configured with instructions which when executed by the processor configure the processor to receive from the broadcast receiver at least first and second audio video (AV) streams for live presentation of the AV streams on the display. The instructions are executable to process the first and second AV streams through respective first and second buffers. Further, the instructions are executable to adjust playout of the second AV stream from the second buffer according to a period of delay between the first and second buffers and present the first and second AV streams together on the display.

In some examples the instructions may be executable to present the first and second AV streams together on the display such that frames of the first AV stream with respective timestamps are presented together with frames of the second AV stream with respective timestamps that represent the same times as the timestamps of the frames of the first AV stream. In non-limiting implementations the instructions can be executable to playout from the first buffer at least a first frame having a first timestamp indicating a first time, and playout from the second buffer at least a first frame having a first timestamp indicating the first time. The instructions also may be executable to identify an actual presentation time of the first frame from the first buffer, identify an actual presentation time of the first frame from the second buffer, and identify the period at least in part by identifying a time period between the actual presentation time of the first frame from the first buffer and the actual presentation time of the first frame from the second buffer.

The first and second AV streams can be of the same event. The first and second AV streams can be generated by respective first and second cameras filming the same live event. The first and second AV streams may be advanced television systems committee (ATSC) 3.0 streams, in which case the instructions may be executable to receive the timestamps in a dynamic adaptive streaming over hypertext transfer protocol (DASH) media presentation description (MPD) and in which the instructions may be implemented by JavaScript in a multiview template.

In some embodiments the instructions may be executable to periodically during presentation of the first and second AV streams calculate the period. The instructions may be executable to measure the period responsive to a difference in actual playout time of a first frame associated with a first timestamp from the first buffer and a first frame from the second buffer with the first timestamp satisfying a value.

In another aspect, a digital television (DTV) receiver includes at least one display and at least one processor configured with instructions to execute JavaScript in a Multiview template to adjust playout of at least first and second AV streams of the same event from respective first and second buffers such that the first and second streams are synchronized on the display.

In another aspect, a method includes playing out at least a first frame of a first audio video (AV) stream from a first buffer. The first frame is associated with a first timestamp. The method also includes playing out at least a first frame of a second AV stream from a second buffer, with the first frame of the second buffer being associated with the first timestamp. The method includes identifying a period between a presentation time of the first frame of the first buffer and a presentation time of the first frame of the second buffer and adjusting playout from at least one of the buffers using the period.

The details of the present application, both as to its structure and operation, can best be understood in reference to the accompanying drawings, in which like reference numerals refer to like parts, and in which:

DETAILED DESCRIPTION

This disclosure relates to technical advances in Advanced Television Systems Committee (ATSC) 3.0 television. A system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access web sites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
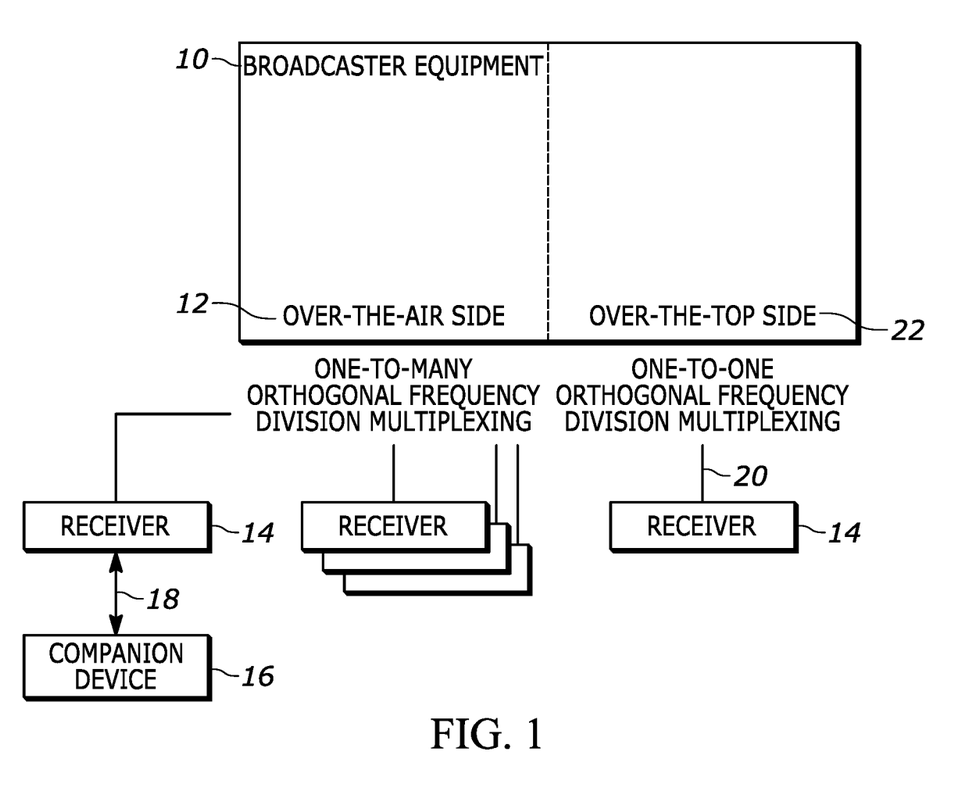
FIG. 1 is a block diagram of an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
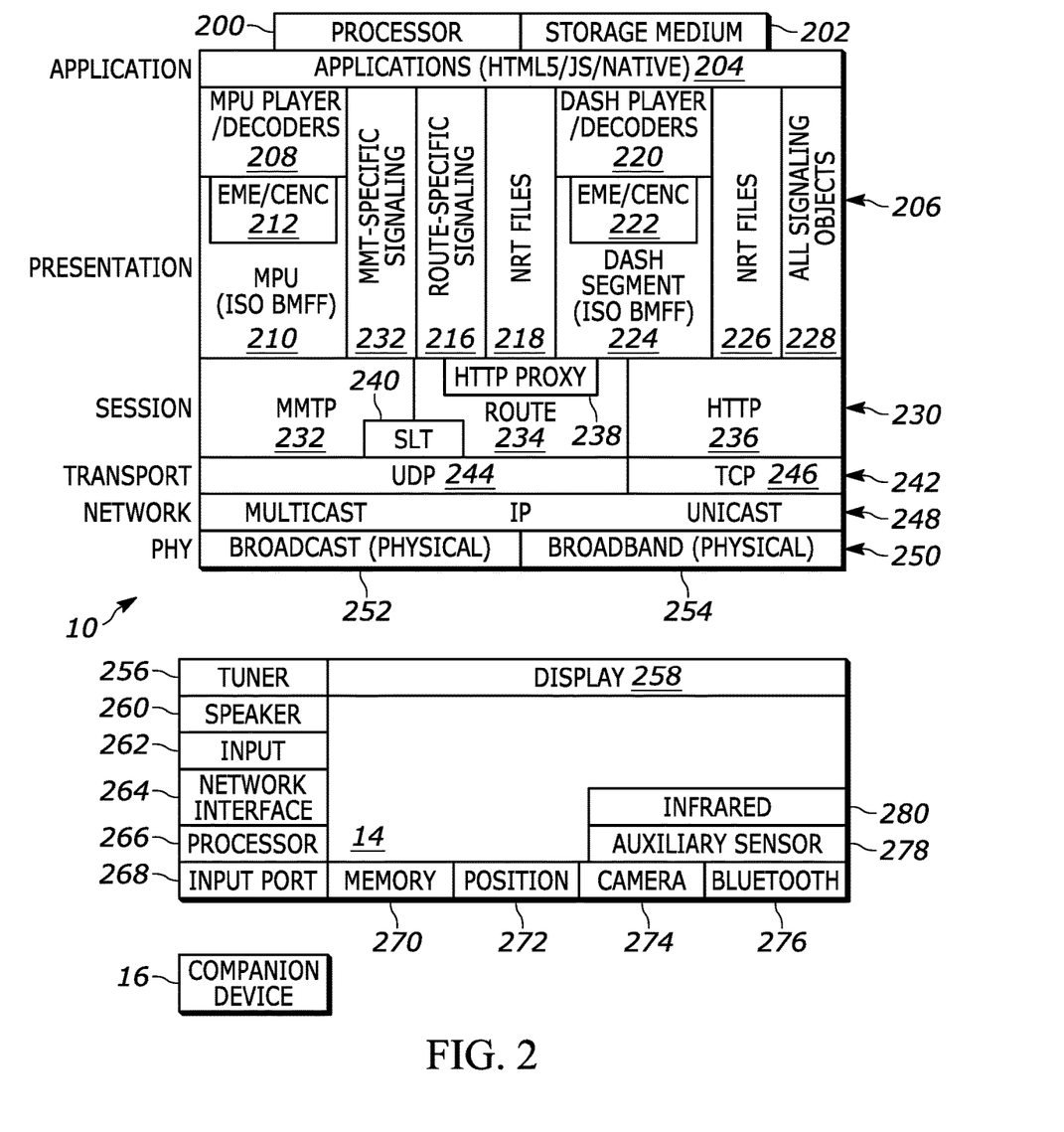
FIG. 2 is a block diagram showing components of the devices shown in FIG. 1.

Referring now to FIG. 2, details of the components shown in FIG. 1 may be seen. FIG. 2 illustrates the broadcaster equipment 10 in terms of a protocol stack that may be implemented by a combination of hardware and software. As discussed below, using the ATSC 3.0 protocol stack, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to execute one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as "media playback units) (MPU) 208 that decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including a motion pictures expert group (MPEG) media transport protocol (MMTP) signaling module 214 and a real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, MMTP protocol 232 and ROUTE protocol 234. MMTP wraps the ISO BMFF files with metadata for broadcast delivery. Essentially, MMTP contains pointers to signaling components that identify physical layer pipes (PL), each of which may be thought of as a separate video stream configured for a particular receiver type with source and destination identification information. Other signaling components typically are provided to aid in the playback of the audio video content.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The protocol stack also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts machine access code (MAC) format to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH-industry forum (IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with a an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
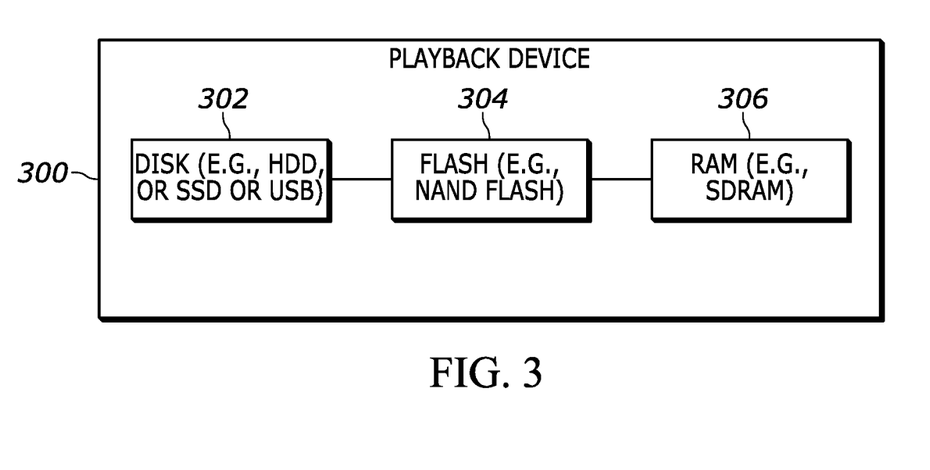
FIG. 3 is a block diagram of an example receiver with example types of memories.

Now referring to FIG. 3, a playback device 300 may include any of the components discussed above in relation to FIGS. 1 and 2 and may further include a disk drive 302 such as a hard disk drive, an optical disk drive, a universal serial bus (USB) drive, and combinations thereof. The disk drive 302 can communicate with other memories that may also communicate with each other for purposes to be shortly disclosed, including a flash memory 304 such as a not-and (NAND) flash and a random access memory (RAM) 306 such as a dynamic RAM (DRAM) and/or synchronous DRAM (SDRAM).

Figure 4:
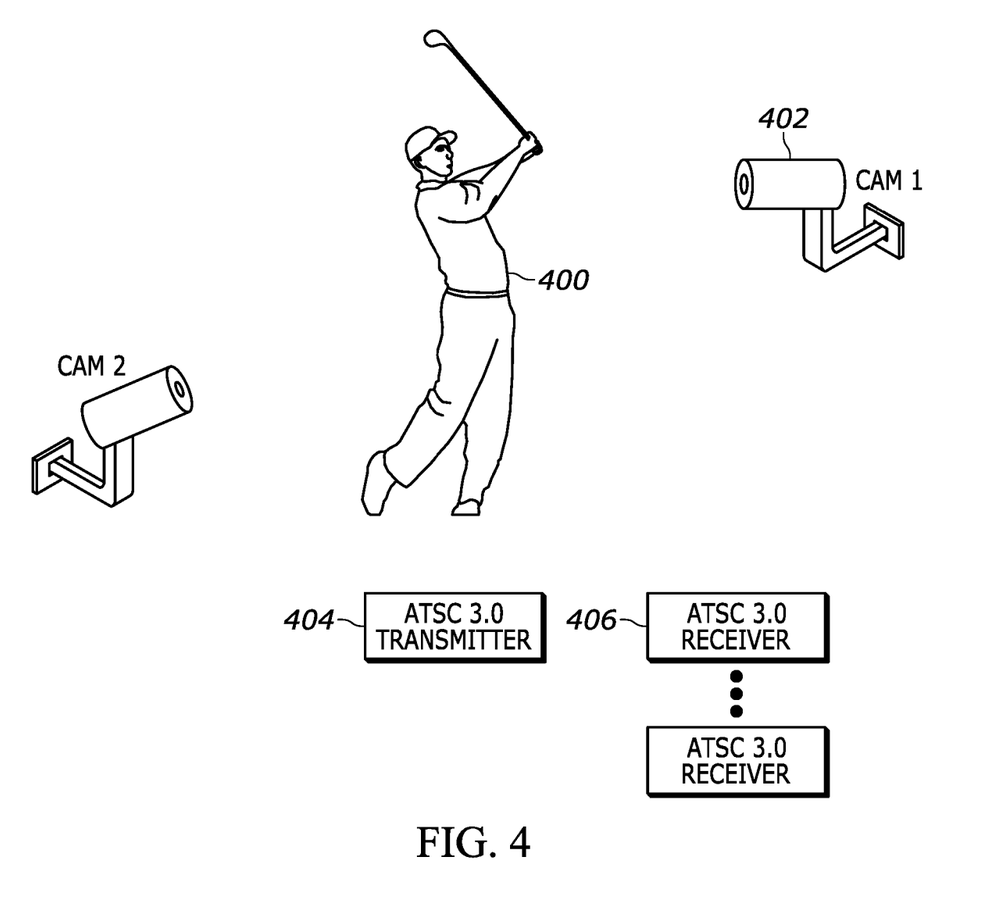
FIG. 4 illustrates live action being filmed by multiple cameras.

FIG. 4 illustrates an athlete 400 (in this case, a golfer) being filmed live by multiple cameras 402 that send their feeds to a digital TV transmitter assembly 404 such as an ATSC 3.0 transmitter for broadcast of the multiple videos in multiple streams to plural digital TV receivers 406 such as ATSC 3.0 receivers. The videos may in parallel be provided broadband. Each camera typically timestamps frames of the video it generates as the frames are generated, to indicate what moment in time each frame (or at least some of the frames0 was captured.

Figure 5:
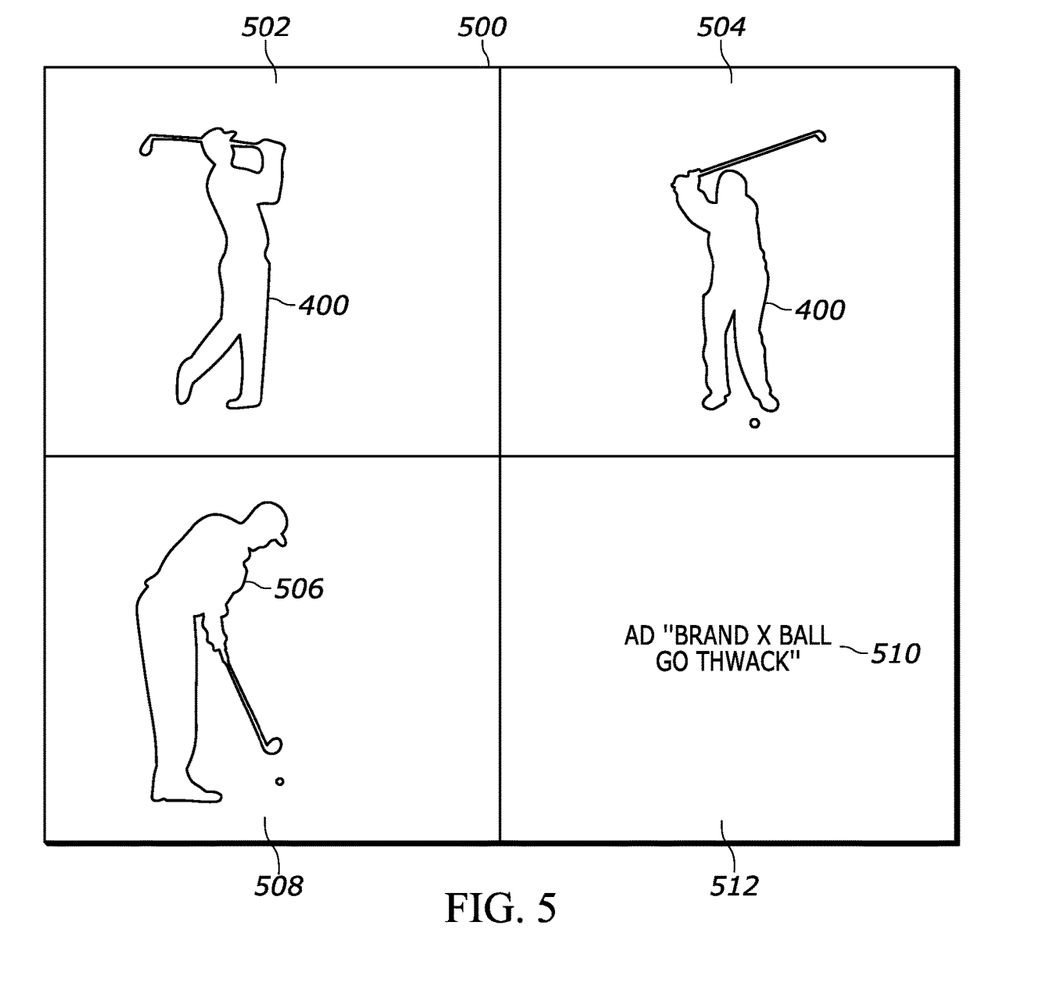
FIG. 5 illustrates a Multiview presentation of the live action on a receiver display.

FIG. 5 illustrates a Multiview presentation on a display 500 such as any of the displays described herein including a display of a receiver 406 shown in FIG. 4. In the non-limiting example shown, the Multiview presentation includes four windows or tiles. A first window 502 presents video of the golfer 400 in FIG. 4 from a first camera 402 while a second window 504 presents video of the golfer 400 in FIG. 4 from a second camera 402 at a different angle. The videos in the windows 502, 504 are synchronized with each other according to disclosure herein such that they both illustrate action from different angles at the same video times as each other, such that a viewer's perception is that he is simultaneously watching the golfer 400 from two different angles with no perceptible lag in the action between the windows 502, 504. In other words, the golfer 400 is shown in both windows as he was at the same moment in time when filmed.

In the example shown, a second golfer 506 at the same tournament as the golfer 400 is shown in a third window 508, and an advertisement 510 is shown in a fourth window 512. The advertisement 510 may also be synchronized with the videos in the windows 502, 504 to emit an audible "thwack" at the same time the golfer 400 strikes his ball.

Figure 6:
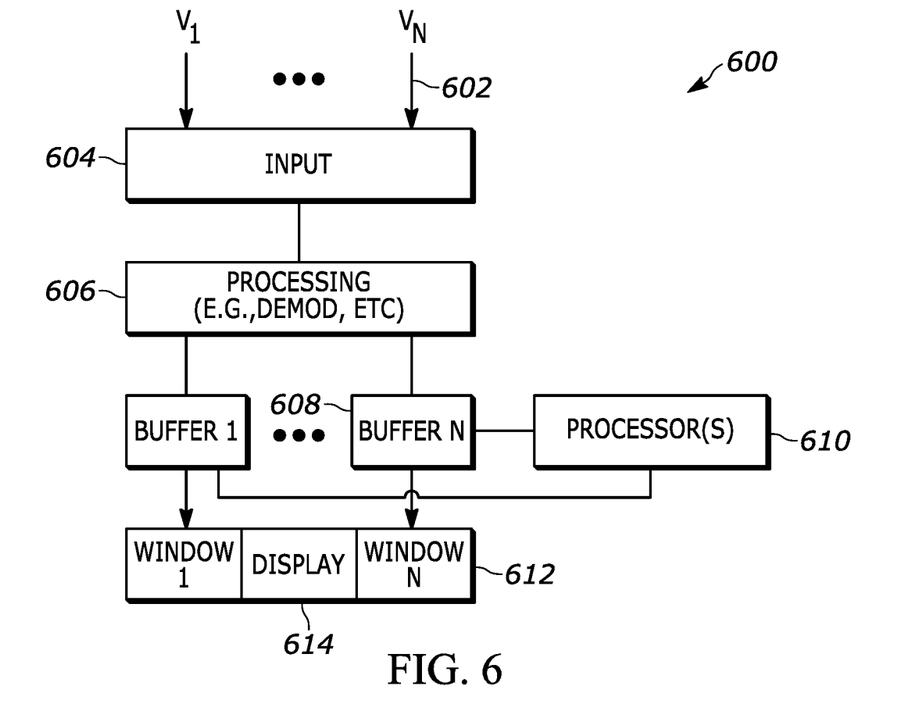
FIG. 6 illustrates example AV stream processing components of a receiver.

FIG. 6 illustrates a receiver portion 600 that may be implemented by any of the receivers herein which receives plural AV streams 602 into a broadcast signal receiver input component 604. AV processing circuitry 606 (such as, e.g., demodulators and the like) process the AV streams 602, which are sent for playout to respective buffers 608 controlled by one or more processors 610 to present the video streams 602 in synchrony in respective windows 612 of a display 614 such as any of the displays described herein. The buffers 608 may be established by, e.g., one or more of the memories shown in FIG. 3.

Figure 7:
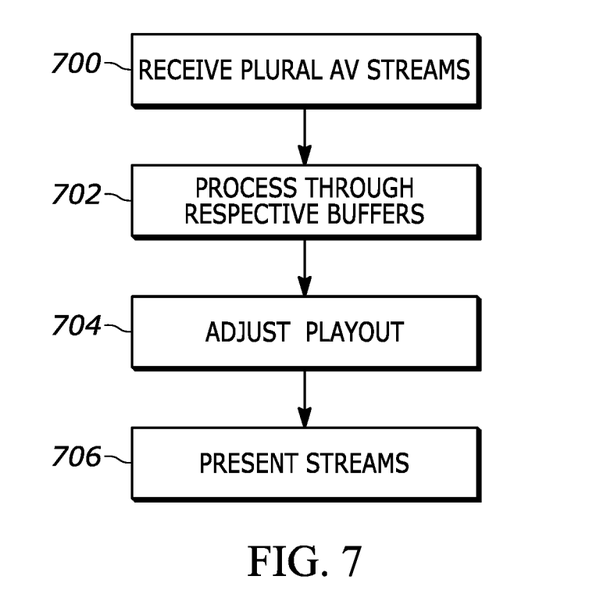
FIGS. 7-10 illustrate example logic in example flow chart format.

FIG. 7 illustrates example logic in example flow chart format to describe how a receiver 406 in FIG. 4 or other AV apparatus disclosed herein can synchronize two or more videos of the same activity from different cameras and different video feeds in the same broadcast or different broadcasts. Note that the logic may be embodied in JavaScript in a Multiview template executed by the receiver processor.

Commencing at block 700, plural AV streams are received for live or delayed presentation of the AV streams on the display. The timestamps associated with video frames may be received in a dynamic adaptive streaming over hypertext transfer protocol (DASH) media presentation description (MPD).

Moving to block 702, the AV streams are processed through respective buffers. Proceeding to block 704, playout of the streams is adjusted from their buffers according to a period of delay with respect to a reference one of the buffers, which may be arbitrarily selected. The AV streams are then presented together on the display 706. In this way, latencies in any particular AV path can be adjusted for so that the two streams are presented as if illustrating simultaneous action. Stated differently, the AV streams are presented together on the display such that frames of a first AV stream with respective timestamps are presented together with frames of a second AV stream with respective timestamps that represent the same times as the timestamps of the frames of the first AV stream.

Figure 8:
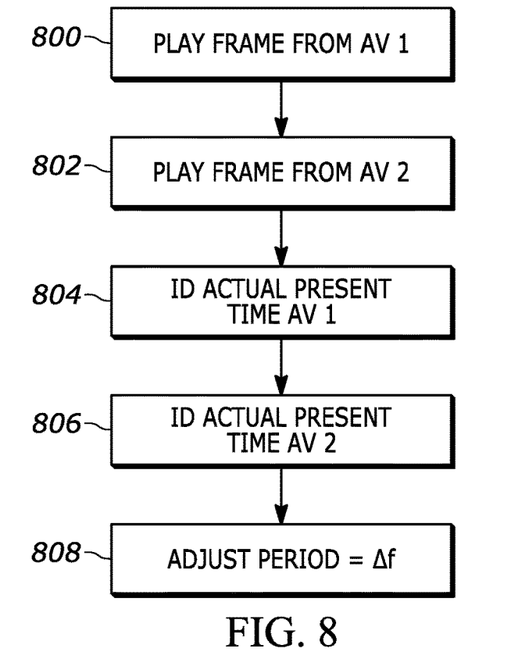

FIG. 8 illustrates more detailed logic. Commencing at block 800 and assuming for simplicity only two AV streams, a first frame having a first timestamp indicating a first time is played out from a first buffer, while at block 802 a first frame having a first timestamp indicating the first time is simultaneously played from a second buffer.

Moving to block 804, an actual presentation time of the first frame from the first buffer is identified and at block 806 an actual presentation time of the first frame from the second buffer is identified. Block 808 indicates that the period by which playout is adjusted in block 704 of FIG. 7 is identified by identifying the time period between the actual presentation time of the first frame from the first buffer and the actual presentation time of the first frame from the second buffer.

Figure 9:
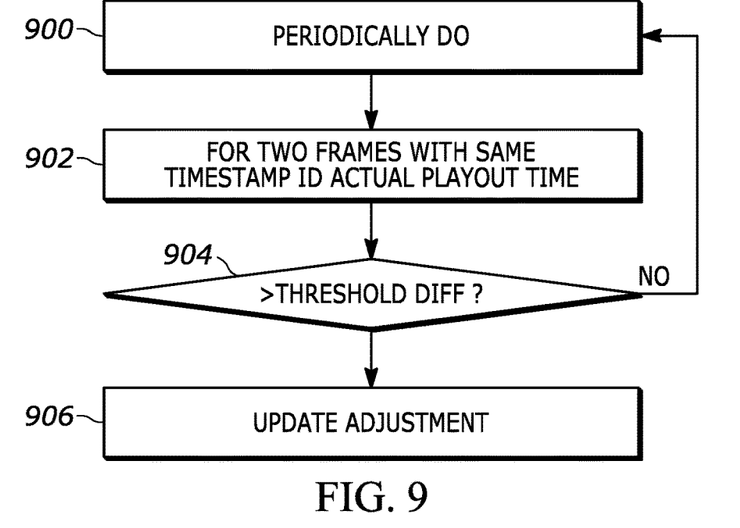

FIG. 9 illustrates additional logic. Commencing at block 900 periodically the logic moves to block 902 to identify a difference in actual playout time of a first frame associated with a first timestamp from the first buffer and a first frame from the second buffer with the first timestamp satisfying a value. In a latency-free environment two frames with the same timestamp should be presented simultaneously, but when differences exist in processing paths between two or more videos, this will not be the case absent present principles.

If it is determined at decision diamond 904 that the difference in playout times satisfies a threshold, the adjustment is updated to reflect the current difference at block 906. Otherwise the logic loops back to block 900.

With the above in mind, it is to be appreciated that present principles solve a synchronization problem between different video streams from different angles of the same event that reliance on timestamps alone cannot remedy. Specifically, because of various differences in the transmission paths of two or more video streams, from transmitter to receiver and through the receiver circuitry to the display output, simply relying on matching timestamps between two or more streams can result in a noticeable timing difference between the streams. One stream may show a golfer from a first angle and a second stream might show the golfer from a second angle, and if the golfer is putting, both angles should show the putter striking the ball at the same time, but owing to the time differences discussed above, this may not be the case. Even a small difference, in which one stream shows the golfer striking the ball a few fractions of a second before the other stream shows the ball strike, is noticeable and distracting. Present principles alleviate this artifact.

It may now be further appreciated that a receiver can execute an event controller that knows how many streams comprise the event and that seeks to time their playout as if they are one broadcast event. Coherent playback means as little lag or latency as possible and that each individual stream by synchronized with the others to minimize camera angles from appearing to have any time delay between them. For example, during the Olympics if a multiview event were being supported, such as several track and field events being run at once, and the Multiview TV is capable of showing them concurrently, the viewer can watch them using one on-screen template. Several independently programmable tiles or URLs embedded in the programmable template access these streams live. A broadcaster application ("app") executed in the end user receiver (such as a TV) manages each stream as part of a single live production. To ensure consistent playback, each stream has its own managed stream buffer. As the TV pulls the required streams live, the audio and video are synchronized, and the video events also are synchronized as they are displayed at once onto a single TV canvas or screen. Because each stream is connected to a single event, it is therefore incumbent upon the broadcaster and the TV to give the same quality of service to each one.

Figure 10:
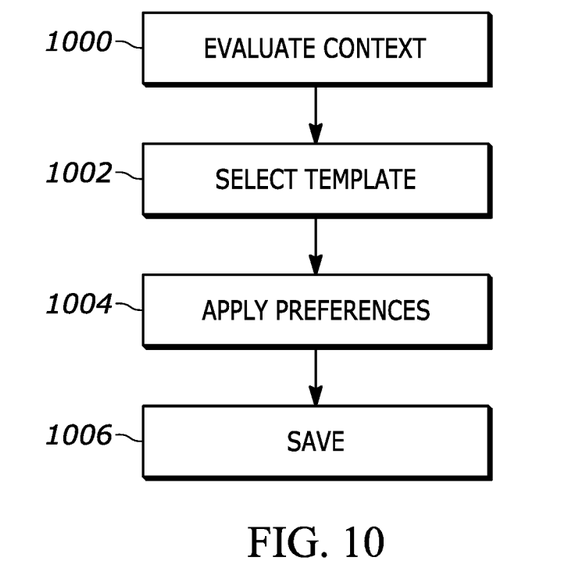

Creating a Multiview experience includes a series of steps that incorporate context aware procedures. FIG. 10 illustrates.

The current input context of where content is coming from (Live TV, video-on-demand (VOD), over-the-air broadcast (OTA), digital video recorder (DVR), Channel Guide, Application) is evaluated at block 1000. Then, at block 1002 the framework or template is selected that will present the multiview experience and content selected to fill the template, with the template being programmed in some embodiments to assign content to a window within the template manually. Audio preferences are then applied at block 1004 (such as "on field audio") and the dominant or active window selected. Any fine-tuning adjustments are made to the viewing canvas by positioning windows for size and location. For this reason, once a template is created or used, the viewer will want to save it, store it, or remember it for instant retrieval at block 1006. The template may also store the corresponding choice of video and audio used with it as a total experience, as a multiview session. In one implementation of programmable multiview, the TV centric model will help automate the multivew experience and allow communication with the Cloud.

Figure 11:
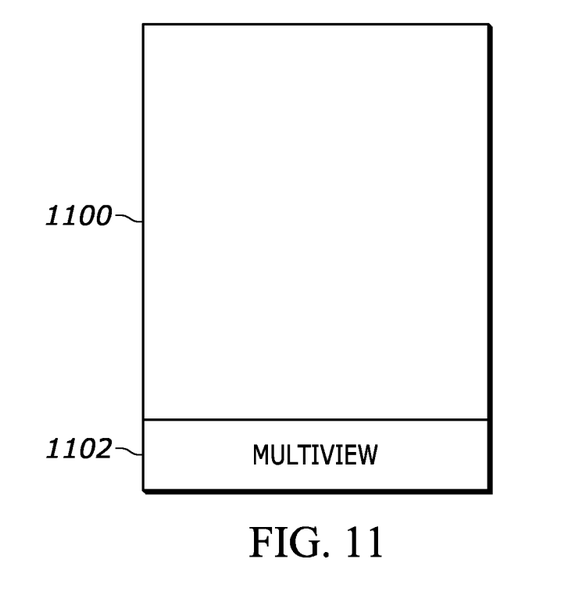
FIG. 11 illustrates an example remote control with a Multiview mode button or key.

FIG. 11 illustrates a remote control (RC) 1100 for any of the devices herein with a Multiview button 1102 that can be manipulated start Java code execution and hypertext markup language (HTML5) JavaScript that implements the automated experience or starts a step-by-step manual process for building the multiview template. Seeing multiview as a programmable service that is launched by a single multiview button allows it to be integrated with other services and TV clients, such as an Ad Insertion program or an automatic content recognition (ACR) program using application programming interfaces (APIs) as opposed to being a simple monolithic "what's on now" channel or one viewing layout for selected channels.

The Multiview mode button 1102 is not a single function return or a basic menu command, but rather a way of initiating the presentation of curated programming, a starting point for an event or a session. Thus a consumer can launch multivew locally or in the cloud connected to a broadcaster to begin the workflow necessary to subscribe to a Cloud-based Multiview curated experience, or a localized Multiview embedded experience with the programmable template having already been designed and so it is applied to a channel or to a viewing session. For example, a template for watching sports or for watching nighttime TV may be created with favorite channels in Multiview mode. For the Cloud it could be the Summer Olympics or the Final Four event or The Master PGA golf event.

Present principles provide techniques to control what happens after a viewer decides to enter Multiview mode by pressing a physical remote-control button or virtual on-screen representation that activates a session. A program running on the TV designed to create the entire multiview experience or workflow gets activated, independent of the current watching experience, yet it takes advantage of the current viewing context. It is not a menu only or pre-mixed only solution. When activated, a multiview microservice incorporates metadata made available by ACR or from the smart TV about programming choices the consumer has already made and translates that into a recommendation of how to fill the current session, such that it can propose multiview content options that are personalized and designed for personal viewing of shows watched together (instead of flipping back and forth between them) or by understanding which channels are favorites, and indexing pre-mixes that are dynamically updated. It is not just the way in which templates are applied or created that are personalized, but the content selection strategy or rationale programmed into the template that is viewer centric and context aware. Programmable Multiview understands the view context such as the Olympics or Final Four Basketball or The Masters for curating how to fill the template with content. A template can come from a library available on the TV, from stock templates or previous ones used. Because the template can be an overlay on top of the viewing canvas within which video parameters are assigned, an HTML5 layout graphic using cascading style sheet (CSS) can be used, referenced as URLs and transmitted over HTTP. Once the template is chosen, the TV pulls down the template live from a remote server or from the TV memory, and the template is applied. Once the template is applied, the next step in creating the multiview experience is the choice of related content/graphical data to be watched. In manual mode, the user uses the remote navigation keys to highlight the appropriate viewing tile, then assign the specific content source. Upon highlighting the template, the viewer selects the content, such as by right clicking on the tile and choosing the content source types, (OTA Broadcast, Cable, Streaming Apps, attached devices), which then leads to actual pieces of saved or live content.

A Multiview button 1102 is the implementation of a Multiview program and/or cloud service that acts as an internal process designed to create and launch the multiview experience or session. It is context aware (what type of content is being watch), program aware, input aware, and has memory to past multiview events. It can be part of the TV stack because it involves so many aspects of the content viewing experience, managing how content is displayed and features available in different viewing contexts.

It will be appreciated that whilst present principals have been described with reference to some example embodiments, these are not intended to be limiting, and that various alternative arrangements may be used to implement the subject matter claimed.

What is claimed is:

1. An assembly, comprising:
   at least one receiver device comprising at least one display, at least one broadcast signal receiver, at least one remote control (RC) for selecting a physical or virtual selector, and at least one processor configured with instructions which when executed by the processor configure the processor to:
   responsive to selection of the selector, implement an automated process for presenting first and second audio video (AV) streams using a multiview template, the multiview template being pre-established in a particular configuration prior to selection of the selector to dynamically present the first and second AV streams at a later time responsive to selection of the selector, the first and second AV streams being concurrently presented according to the multiview template based on the automated process and responsive to selection of the selector, the first and second AV streams being identified responsive to selection of the selector independent of a current watching experience but still being identified based on a current viewing context being correlated to a past viewing context such that content presented using the multiview template is tailored for viewing of different shows that have been previously watched together via a user flipping back and forth between the different shows, the different shows as watched together in the past comprising a first show accessed via a digital video recorder (DVR) and a second show streamed by a content provider rather than accessed via the DVR.

2. The assembly of claim 1, wherein the instructions are executable to:
   present the first and second AV streams together on the display such that frames of the first AV stream with respective timestamps are presented together with frames of the second AV stream with respective timestamps that represent the same times as the timestamps of the frames of the first AV stream.

3. The assembly of claim 1, wherein the instructions are executable to:
   playout from a first buffer for the first AV content at least a first frame having a first timestamp indicating a first time;
   playout from a second buffer for the second AV content at least a first frame having a first timestamp indicating the first time;

identify an actual presentation time of the first frame from the first buffer;

identify an actual presentation time of the first frame from the second buffer; and identify a period of delay between the first and second buffers at least in part by identifying a time period between the actual presentation time of the first frame from the first buffer and the actual presentation time of the first frame from the second buffer.

4. The assembly of claim 1, wherein the first and second AV streams are related to different events.

5. The assembly of claim 1, wherein the first and second AV streams are advanced television systems committee (ATSC) 3.0 streams.

6. The assembly of claim 2, wherein the instructions are executable to:

receive the timestamps in a dynamic adaptive streaming over hypertext transfer protocol (DASH) media presentation description (MPD).

7. The assembly of claim 1, wherein the instructions are executable to:

adjust playout of the second AV stream from the second buffer according to a period of delay between the first and second buffers; and periodically, during presentation of the first and second AV streams, recalculate the period.

8. The assembly of claim 3, wherein the instructions are executable to:

adjust playout of the second AV stream from the second buffer according to the period of delay between the first and second buffers; and measure the period of delay responsive to a difference in actual presentation time of a first frame associated with a first timestamp from the first buffer and a first frame from the second buffer with the first timestamp satisfying a value.

9. The assembly of claim 1, wherein the past and current viewing contexts are related to watching nighttime television.

10. The assembly of claim 1, wherein the past and current viewing contexts are related to watching sports.

11. The assembly of claim 1, wherein the current viewing context is determined based on a current time of day.

12. The assembly of claim 1, wherein the template uses respective uniform resource locators (URLs) to access the first and second AV streams.

* * * * *